(12) United States Patent
Amtmann et al.

(10) Patent No.: US 9,821,497 B2
(45) Date of Patent: Nov. 21, 2017

(54) METHOD FOR DIRECT INLINE MOLDING OF PRE-IMPREGNATED COMPOSITES

(71) Applicant: MAGNA INTERNATIONAL INC., Aurora (CA)

(72) Inventors: Maximilian Amtmann, Brampton (CA); Boris Shulkin, West Bloomfield, MI (US); Aldo Van Gelder, Newmarket (CA); Todd Deaville, Markham (CA)

(73) Assignee: Magna International Inc., Aurora, Ontario (CA)

( * ) Notice: Subject to any disclaimer, the term of this patent is extended or adjusted under 35 U.S.C. 154(b) by 453 days.

(21) Appl. No.: 14/372,059

(22) PCT Filed: Jan. 10, 2013

(86) PCT No.: PCT/CA2013/000020
§ 371 (c)(1),
(2) Date: Jul. 14, 2014

(87) PCT Pub. No.: WO2013/104058
PCT Pub. Date: Jul. 18, 2013

(65) Prior Publication Data
US 2014/0339742 A1 Nov. 20, 2014

Related U.S. Application Data
(60) Provisional application No. 61/586,265, filed on Jan. 13, 2012.

(51) Int. Cl.
*B29C 43/52* (2006.01)
*B29C 43/18* (2006.01)
(Continued)

(52) U.S. Cl.
CPC .............. *B29C 43/52* (2013.01); *B29C 43/18* (2013.01); *B29C 70/46* (2013.01);
(Continued)

(58) Field of Classification Search
CPC ......... B29C 43/52; B29C 43/18; B29C 70/46; B29K 2309/00; B29K 2031/00;
(Continued)

(56) References Cited

U.S. PATENT DOCUMENTS

| 4,117,067 A | 9/1978 | Charter et al. |
| 5,230,906 A | 7/1993 | Mueller |

(Continued)

FOREIGN PATENT DOCUMENTS

| WO | 90/06226 A1 | 6/1990 |
| WO | WO 2005102663 A1 | 11/2005 |

(Continued)

OTHER PUBLICATIONS

Graf et al., "HP-RTM—Process Advancements," 10th ACCE, Sep. 15-16, 2010, pp. 1-39.

(Continued)

*Primary Examiner* — Robert J Grun
(74) *Attorney, Agent, or Firm* — The Noblitt Group, PLLC

(57) ABSTRACT

A system for fabricating a composite article includes a pre-impregnation station for forming a prepreg comprising a reinforcement impregnated with a resin. The prepreg is provided to a blanking station where a blank is cut from the partially cured prepreg and arranged onto a preforming mold. The blank is then transferred to a forming station, and is formed into the composite article using a compression mold. The pre-impregnation station, the blanking station and the forming station are co-located. During forming of the blank into the composite article using the compression mold, (Continued)

additional prepreg is formed in the pre-impregnation station and passes to the blanking station so as to form a next blank for being formed into a next composite article during a subsequent molding cycle. Optionally, the prepreg is partially cured prior to being cut in the blanking station.

16 Claims, 3 Drawing Sheets

(51) Int. Cl.
*B29C 70/46* (2006.01)
*B29K 31/00* (2006.01)
*B29K 63/00* (2006.01)
*B29K 67/00* (2006.01)
*B29K 75/00* (2006.01)
*B29K 307/04* (2006.01)
*B29K 309/00* (2006.01)
*B29K 309/08* (2006.01)

(52) U.S. Cl.
CPC ...... *B29K 2031/00* (2013.01); *B29K 2063/00* (2013.01); *B29K 2067/00* (2013.01); *B29K 2075/00* (2013.01); *B29K 2277/10* (2013.01); *B29K 2307/04* (2013.01); *B29K 2309/00* (2013.01); *B29K 2309/08* (2013.01)

(58) Field of Classification Search
CPC ............ B29K 2067/00; B29K 2277/10; B29K 2063/00; B29K 2309/08; B29K 2075/00; B29K 2307/04
See application file for complete search history.

(56) References Cited

U.S. PATENT DOCUMENTS

| | | | |
|---|---|---|---|
| 5,857,215 | A | 1/1999 | Fergason et al. |
| 7,611,601 | B2 | 11/2009 | Nelson et al. |
| 2003/0138602 | A1 | 7/2003 | Lorenz et al. |
| 2004/0188883 | A1 | 9/2004 | Barron et al. |
| 2008/0292851 | A1 | 11/2008 | Egerer et al. |
| 2010/0124659 | A1 | 5/2010 | Nelson et al. |

FOREIGN PATENT DOCUMENTS

| | | |
|---|---|---|
| WO | WO 2006023365 A2 | 3/2006 |
| WO | WO 2008134505 A2 | 11/2008 |
| WO | WO 2010039665 A1 | 4/2010 |
| WO | WO 2011056293 A1 | 5/2011 |
| WO | WO 2011113558 A2 | 9/2011 |

OTHER PUBLICATIONS

PCT Application PCT/CA2013/000020 Search Report, dated Apr. 4, 2013.

METHOD FOR DIRECT INLINE MOLDING OF PRE-IMPREGNATED COMPOSITES

CROSS REFERENCE TO RELATED APPLICATION

This PCT Patent Application claims the benefit of U.S. provisional application Ser. No. 61/586,265 filed Jan. 13, 2012, the entire disclosure of the application being considered part of the disclosure of this application, and hereby incorporated by reference.

FIELD OF THE INVENTION

The invention relates generally to a method for fabricating articles from pre-impregnated composite materials, and more particularly to a method for direct inline molding of pre-impregnated composites.

BACKGROUND OF THE INVENTION

Composite materials are used routinely in the aerospace, automotive and sporting goods industries, to name just a few examples. Structural composite articles are lighter, offer better corrosion resistance, and display improved resistance to damage from cyclic loading (fatigue) compared to corresponding articles that are formed from machined metals. For instance, replacing an aluminum structure with graphite/epoxy composite may achieve a weight reduction of greater than 20%.

Unfortunately, relatively high costs are associated with the manufacture of composite articles. A typical process begins with the preparation of a preimpregnation, or prepreg, which is a ready-to-mold sheet of fiber reinforcement that has been preimpregnated with a resin system. The resin component of a prepreg is usually thermosetting, but thermoplastic prepregs are available as well. For thermosetting prepregs, the resin is partially cured to a B-stage condition and supplied to the fabricator, who lays up the finished shape using the required layers of prepreg. The fabricator then completes the cure with heat and pressure.

The majority of thermoset prepegs require refrigeration to a temperature as low as −20° C. (approximately 0° F.) to preserve their physical and chemical characteristics. As such, prepegs are normally transported in refrigerated trucks or packed in dry ice for air transport. Further, it is necessary to store the prepegs at low temperature even after delivery to the fabricator. When part fabrication begins, the prepreg is removed from cold storage and warmed to room temperature. Remaining quantities of prepreg must be returned to cold storage. Out-time, which refers to how long a prepreg can remain out of cold storage and still retain its properties without degrading, must be documented for critical applications. If out-time nears or exceeds the manufacturer's specified shelf life, the material must be retested and recertified or disposed of, both of which are costly options. The need to store and transport thermosetting prepreg under conditions of low temperature, as well as the cost of disposing of degraded prepreg, limits the use of fiber reinforced composite articles to a relatively few applications with specialized requirements.

Although prepregs that are based on thermoplastic materials do not require refrigeration to a temperature as low as −20° C. during transportation and storage, they are nevertheless susceptible to degradation under certain conditions. In particular, the heat history of a thermoplastic prepreg is an important consideration. It is therefore a disadvantage of prior art systems that a thermoplastic prepreg is produced at elevated temperature and then subsequently cooled to about room temperature for storage and shipping. After the prepreg is transported to a production facility, it must be heated up again to a suitable forming temperature. Since a thermoplastic prepreg degrades during each heating and cooling cycle it is subjected to, the properties of the final product that is formed from such a prepreg may be compromised. Another disadvantage that is associated with cooling and reheating the thermoplastic prepreg relates to energy wastage. In particular, the heat that is provided to form the thermoplastic prepreg is wasted because the prepreg is allowed to cool down for storage or transportation, and then it must be reheated during the operation to form the composite article.

Other known processes for the manufacture of composite articles include Resin Transfer Molding and Resin Infusion Molding. In both of these processes the sheets of fiber reinforcement are arranged in a mold, which is then closed prior to the sheets being wetted with resin. The resin is subsequently injected into the mold during forming of the final product. Unfortunately, processes in which the resin material is injected directly into the mold tend to be slow and/or uniform wetting of the sheets of fiber reinforcement may not occur. As a result, these methods tend to be used to produce parts that do not require high quality or defect free surfaces.

It would be beneficial to provide a system and method for forming composite articles that overcome at least some of the above-mentioned limitations of the prior art.

SUMMARY OF THE INVENTION

According to one aspect, the invention is directed to a method of fabricating a composite article, comprising: a) forming a prepreg comprising a reinforcement impregnated with a resin; b) receiving one end of the prepreg at a cutter and cutting from the one end of the prepreg a blank for forming the composite article; c) arranging the blank on a preforming mold such that a shape of the blank, when so arranged, corresponds approximately to a final shape of the composite article; d) transferring the blank from the preforming mold to a compression mold; e) using the compression mold, applying heat and pressure to the blank so as to form the composite article; and f) during forming of the composite article using the compression mold, repeating steps a) to c).

According to another aspect, the invention is directed to a method of fabricating a composite article, comprising: performing a pre-impregnation process to form a prepreg having a reinforcement impregnated with a resin, the pre-impregnation process performed at a predetermined rate; molding the prepreg to form the composite article, each cycle of the molding having a known cycle time and comprising: cutting a blank from the prepreg; arranging the blank on a preforming mold to form a preformed blank; transferring the preformed blank from the preforming mold to a compression mold; and applying heat and pressure to the preformed blank inside the compression mold so as to form the composite article, wherein the rate of the pre-impregnation process is predetermined based on the known cycle time of the molding process, such that during each current molding cycle the pre-impregnation process yields a quantity of prepreg to form the blank for use in a corresponding next molding cycle.

According to another aspect, the invention is directed to a method of fabricating a composite article, comprising:

during a first period of time, forming a first preformed blank, comprising: impregnating a first portion of a reinforcement with a resin; cutting a first blank from the impregnated first portion of the reinforcement; and arranging the first blank on a preforming mold to form the first preformed blank; and transferring the first preformed blank from the preforming mold to a compression mold; during a second period of time subsequent to the first period of time, forming the composite article in the compression mold; during a third period of time at least partially overlapping with the second period of time, forming a second preformed blank, comprising: impregnating a second portion of the reinforcement with the resin; cutting a second blank from the impregnated second portion of the reinforcement; and, arranging the second blank on the preforming mold.

According to another aspect, the invention is directed to a system for fabricating a composite article, comprising: a pre-impregnation station for forming a prepreg comprising a reinforcement impregnated with a resin; a blanking station for cutting a blank from the prepreg and for arranging the blank on a preforming mold; and a forming station comprising a compression mold for forming the composite article from the blank by the application of heat and pressure to said blank, wherein the pre-impregnation station, the blanking station and the forming station are co-located, such that while the blank is being formed into the composite article in the compression mold, additional prepreg is formed in the pre-impregnation station and passes to the blanking station to form a next blank for being formed into a next composite article in the compression mold during a subsequent molding cycle.

According to another aspect, the invention is directed to a method of fabricating a composite article, comprising: a) cutting a blank from a sheet of a fiber reinforcement, the cut blank having a shape for forming the composite article; b) impregnating the cut blank with a resin to form a prepreg blank; c) arranging the prepreg blank on a preforming mold such that a shape of the blank, when so arranged, corresponds approximately to a final shape of the composite article; d) transferring the arranged blank from the preforming mold to a compression mold; e) using the compression mold, applying heat and pressure to the blank so as to form the composite article; and f) during forming of the composite article using the compression mold, repeating steps a) to c).

BRIEF DESCRIPTION OF THE DRAWINGS

The instant invention will now be described by way of example only, with reference to the attached drawing, and in which.

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
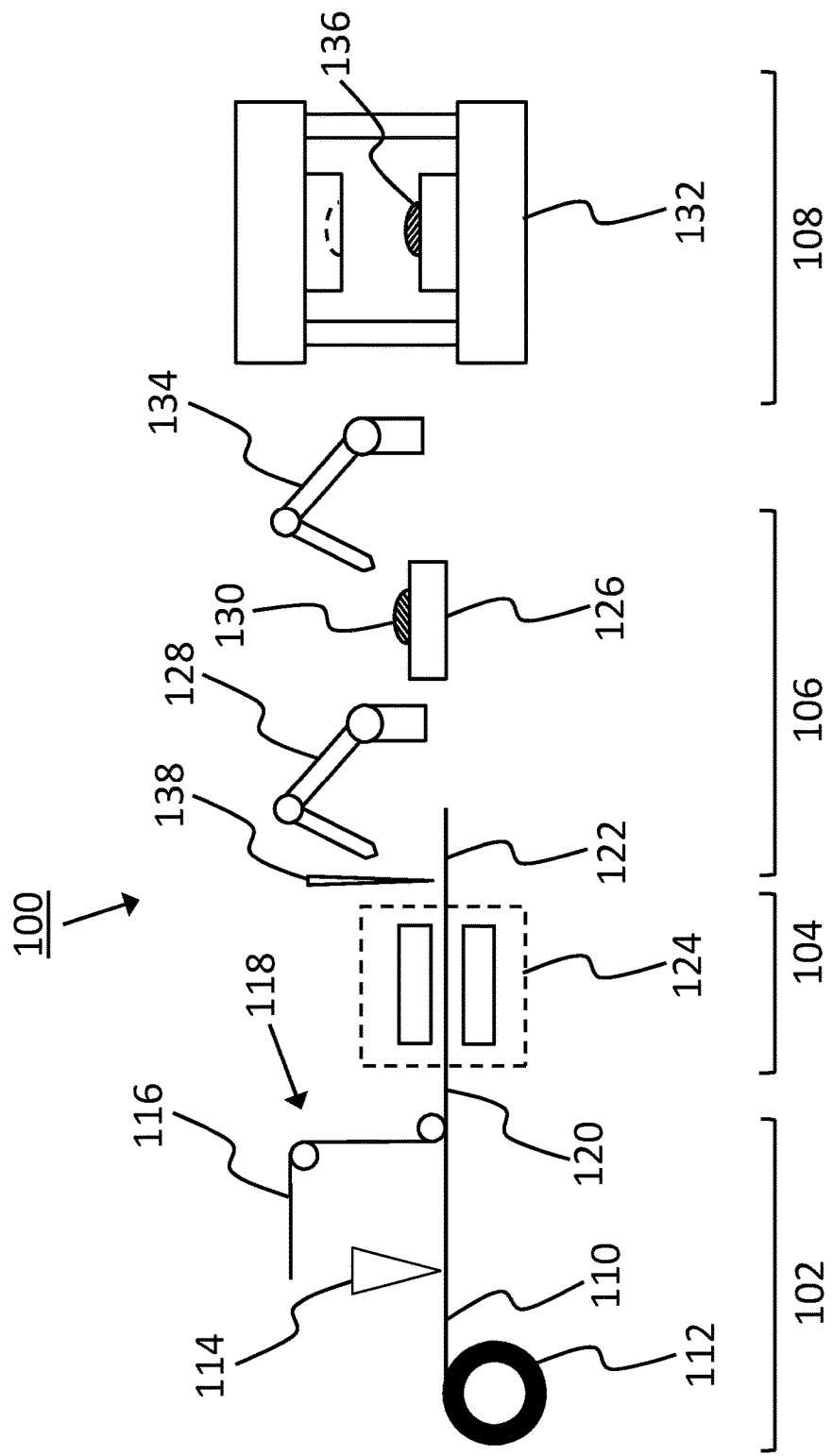
FIG. 1 is a simplified diagram illustrating a system 100 for the direct inline molding of composite articles, according to an embodiment of the instant invention.

Referring to FIG. 1, shown is a simplified diagram illustrating a system for the direct inline molding of composite articles, according to an embodiment of the instant invention. The system is shown generally at 100, and includes a pre-impregnation station 102, an optional curing station 104, a blanking station 106 and a forming station 108. In the specific and non-limiting example that is shown in FIG. 1, a carrier film 110 is unwound from carrier film unwind 112. A resin is applied at resin applicator 114, and reinforcement 116 is unwound from reinforcement unwind 118 onto the surface of the carrier film 110. Not illustrated rollers etc. are used to ensure proper wetting of the reinforcement 116 by the resin, resulting in prepreg 120.

In the system 100 of FIG. 1 the curing station 104 is considered optional since the prepreg is intended to be formed, transferred to the blanking station, cut to shape, and transferred directly into a compression mold. Thus, in the case of prepregs that are based on thermosetting resins the partial curing step that is typical of prior art processes may be omitted, since the usual concerns relating to transporting and storing the thermosetting prepreg do not exist. In particular, by application of heat and pressure within the compression mold the prepreg is cured prior to any significant degradation occurring. In the description that follows, by way of a specific and non-limiting example, the curing station 104 is present in the system 100.

Referring still to FIG. 1, as the carrier film 110 and reinforcement 116 continue to unwind from carrier film unwind 112 and reinforcement unwind 118, respectively, the prepreg is advanced through curing station 104 to form partially cured prepreg 122. The curing station 104 includes an energy source 124 for providing the energy that is required to partially cure the prepreg 120. By way of a few specific and non-limiting examples, the energy source 124 is one of an oven and an ultraviolet radiation source. At this stage, the partially cured prepreg 122 has tack and drape properties that are tailored for the desired end product.

One end of the partially cured prepreg 122 is received at cutter 138 of the blanking station 106, and at least one blank for forming the composite article is cut from the one end of the partially cured prepreg 122 and transferred to a preforming mold 126. In the instant example, for instance, a robot 128 performs at least one of the cutting and the transferring. The at least one blank is arranged on the preforming mold such that a shape of the blank assembly 130, when so arranged, corresponds approximately to a final shape of the composite article. The arranged blank assembly 130 may include multiple plies and/or inserts/reinforcement/attachment features, etc. The blank assembly 130 is subsequently transferred from the preforming mold 126 to a compression mold 132 of the forming station 108. For instance, the blank assembly 130 is transferred from the preforming mold 126 to the compression mold 132 under the control of robot 134. Depending on the particular arrangement of the system 100, optionally a single robot that performs the combined functions of robots 128 and 134 is used in place of separate robots 128 and 134.

The compression mold 132 is configured to apply heat and pressure to the blank assembly 130, during a molding cycle, so as to form the composite article 136, which is shown in the opened compression mold 132 in FIG. 1 subsequent to the completion of a molding cycle. Once formed, the composite article 136 is removed from the compression mold 132, and the compression mold 132 is charged with a next blank assembly 130 prior to beginning a next molding cycle.

The pre-impregnation station 102, the curing station 104, the blanking station 106 and the forming station 108 are all co-located within a facility, such that while one blank assembly is being formed into the composite article 136 in the forming station 108, additional prepreg 120 is being formed in the pre-impregnation station 102 and passes through the curing station 104 to the blanking station 106 to form a next blank assembly 130. The next blank assembly 130 is then formed into a next composite article in the compression mold 132 during a subsequent molding cycle. By co-located, it is meant that each one of the stations 102, 104, 106 and 108 is disposed relative to the other ones of the stations 102, 104, 106 and 108 such that prepreg 120 is formed and partially cured, a blank is cut to shape from the partially cured prepreg 122 according to a pattern for the composite article 136 that is being formed, the blank 130 is arranged such that a shape of the blank 130 corresponds approximately to the final shape of the composite article, and the blank is molded by the application of heat and pressure in a compression mold, all without requiring storage or transport under refrigerated conditions during the carrying out of the process. Thus, co-located refers not only to the spatial distribution of the stations 102, 104, 106 and 108, but additionally to the temporal relationship between the processes that are performed at each of the stations 102, 104, 106 and 108. That is to say, the entire process, which comprises the processes that are performed at each of the stations 102, 104, 106 and 108, occurs on a timescale such that once the prepreg is produced, the cure is completed to form the composite article sufficiently quickly that the prepreg does not degrade, even though it is other than stored or transported using a refrigerated unit. In particular, the system 100 other than includes a refrigerated unit, such as for instance a cold room, a refrigerated truck or dry ice shipping material.

In order to provide a better understanding of the various features of the system 100 of FIG. 1, and the way in which the various stations (102, 104, 106 and 108) cooperate during use, several methods will now be described, as follows below. In the following methods, it is assumed that the optional partial curing step is omitted.

One method of fabricating a composite article includes at least the following steps:
 a) forming a prepreg comprising a reinforcement impregnated with a resin;
 b) receiving one end of the prepreg at a cutter and cutting from the one end of the prepreg a blank for forming the composite article;
 c) arranging the blank on a preforming mold such that a shape of the blank, when so arranged, corresponds approximately to a final shape of the composite article;
 d) transferring the blank from the preforming mold to a compression mold;
 e) using the compression mold, applying heat and pressure to the blank so as to form the composite article; and
 f) during forming of the composite article using the compression mold, repeating steps a) to c).

According to this method, when one blank is being formed in the compression mold another blank is being produced more or less concurrently. That is to say, a rate of producing the prepreg is selected to approximately match a rate of forming the composite article using the compression mold. In the case of a thermosetting prepreg, wherein the reinforcement is impregnated with a thermosetting resin, the prepreg is optionally partially cured prior to being received at the cutter. The partially cured prepreg is then cut to shape and arranged to provide a blank, and the blank is formed into the composite article, all on a time scale that is faster than the degradation of the partially cured prepreg outside of cold storage. As such, subsequent to partially curing the prepreg it is other than necessary to either store or transport the partially cured prepreg using a refrigerated unit, such as for instance one or more of a cold room, a refrigerated truck and dry ice shipping materials.

Of course, when the blank is cut from the prepreg absent partial curing, then the curing occurs entirely within the compression mold after the blank is transferred thereto and heat and pressure is applied.

Optionally, the reinforcement is impregnated with a thermoplastic resin and the method proceeds as outlined above.

Another method of fabricating a composite article includes at least the following steps:
 performing a pre-impregnation process to form a prepreg having a reinforcement impregnated with a resin, the pre-impregnation process performed at a predetermined rate;
 molding the prepreg to form the composite article, each cycle of the molding having a known cycle time and comprising:
  cutting a blank from the prepreg;
  arranging the blank on a preforming mold to form a preformed blank;
  transferring the preformed blank from the preforming mold to a compression mold; and
  applying heat and pressure to the preformed blank inside the compression mold so as to form the composite article.

According to this method, the rate of the pre-impregnation process is predetermined based on the known cycle time of the molding process, such that during each current molding cycle the pre-impregnation process yields a quantity of prepreg to make the blank for use in a corresponding next molding cycle. Thus, when one blank is being formed in the compression mold to make the composite article, another blank is being produced more or less concurrently. In the case of a thermosetting prepreg, wherein the reinforcement is impregnated with a thermosetting resin, the prepreg is optionally partially cured prior to the blank being cut therefrom. The partially cured prepreg is cut to shape and arranged to form a blank, and the blank is formed into the composite article, all on a time scale that is faster than the degradation of the partially cured prepreg outside of cold storage. As such, subsequent to partially curing the prepreg it is other than necessary to either store or transport the partially cured prepreg using a refrigerated unit, such as for instance one or more of a cold room, a refrigerated truck and dry ice shipping materials.

Of course, when the blank is cut from the prepreg absent partial curing, then the curing occurs entirely within the compression mold after the blank is transferred thereto and heat and pressure is applied.

Optionally, the reinforcement is impregnated with a thermoplastic resin and the method proceeds as outlined above.

Yet another method of fabricating a composite article includes at least the following steps:

during a first period of time, forming a first preformed blank, comprising:
  impregnating a first portion of a reinforcement with a resin;
  cutting a first blank from the impregnated first portion of the reinforcement; and
  arranging the first blank on a preforming mold to form the first preformed blank;
transferring the first preformed blank from the preforming mold to a compression mold;
during a second period of time subsequent to the first period of time, forming the composite article in the compression mold;
during a third period of time at least partially overlapping with the second period of time, forming a second preformed blank, comprising:
  impregnating a second portion of the reinforcement with the resin;
  cutting a second blank from the impregnated second portion of the reinforcement; and,
  arranging the second blank on the preforming mold.

According to this method, when one blank is being formed into the composite article in the compression mold (during the second period of time) another blank is being produced more or less concurrently (during the third period of time). In the case of a thermosetting prepreg, wherein the reinforcement is impregnated with a thermosetting resin, the prepreg is optionally partially cured prior to the first and second blanks being cut therefrom. According to this method the impregnated reinforcement is partially cured, cut to shape and arranged to form a blank, and the blank is formed into the composite article, all on a time scale that is faster than the degradation of the partially cured impregnated reinforcement outside of cold storage. As such, subsequent to being partially cured it is other than necessary to either store or transport the partially cured impregnated reinforcement using a refrigerated unit, such as for instance one or more of a cold room, a refrigerated truck and dry ice shipping materials.

Of course, when the blank is cut from the prepreg absent partial curing, then the curing occurs entirely within the compression mold after the blank is transferred thereto and heat and pressure is applied.

Optionally, the reinforcement is impregnated with a thermoplastic resin and the method proceeds as outlined above.

The system that is shown in FIG. 1, and the methods that are described supra, have been discussed in general terms in order to provide a clear understanding of various embodiments of the invention. The system and methods are suitable for use with a wide variety of thermosetting resins and reinforcements. For instance, the resin is a thermosetting resin that is optionally selected from the following group: epoxy, vinyl ester, polyester, polyurethane, or another suitable thermosetting resin system. Similarly, the reinforcement 116 is a fiber reinforcement that is optionally selected from the following group: glass fibers, carbon fibers, aramid fibers, basalt fibers, or another suitable fiber reinforcement. Optionally, the fiber reinforcement 116 is introduced in the form of bundles, unidirectional sheet, or a woven pattern into the impregnation apparatus.

As noted above, the thermosetting resin is optionally partially cured using heat or ultraviolet radiation, or another suitable activator is used, resulting in a continuous roll or sheet of pliable composite (partially cured prepreg 122) with typically 50-70% by mass fiber content. This roll or sheet is then fed into an automated cutter 138, which slices a required pattern based on the blank needed for the article that is being produced. In at least some cases, plural blanks are then stacked and oriented on preforming mold 126 (or a buck) in the order, orientation and number of plies required to mold the desired article 136. Once the preformed blank 130 is complete, a robot (i.e. robot 134) picks and places the blank 130 into the compression mold 132 which then forms the article 136 during a molding cycle. The formed article 136 is removed from the compression mold 132 at the end of the molding cycle (approximately 2-5 minute cycle time) and excess material, if any, is trimmed from the article 136 using conventional techniques, such as for instance waterjet cutting, router, laser, knife, ultrasonic knife, etc.

Of course, the system has been described in terms of a system including one pre-impregnation station 102, one curing station 104, one blanking station 106 and one forming station 108. In this specific and non-limiting example, the rate of prepreg production is approximately matched to the molding cycle time, such that in-process storage is not required. Optionally, the number of some of the above-noted stations is other than one. For instance, in an optional system two separate forming stations 108 are provided. In this case, the rate of prepreg production may be selected to exceed the molding rate of the individual forming stations. That is to say, assuming the molding cycle time for each forming station 108 is the same, the rate of prepreg production is selected to produce two blanks during the molding cycle time. Further optionally, one or more blanking stations 106 is provided for producing two different types of blanks, including a first type of blank for forming a first composite article in a first one of the forming stations, and a second type of blank for forming a second composite article in a second one of the forming stations. Of course, a person having ordinary skill in the art will readily envisage other variations, substitutions or additions to the system of FIG. 1.

The system of FIG. 1, and the associated methods described supra, eliminate the need to ship and store pre-impregnated resin composites for use with a compression molding process. As discussed previously, typically prepreg material is cooled quickly after it is manufactured, and stored at low temperature (typically −20 C) to prevent it from reacting before it is used in a molding operation. This allows the prepreg fabrication and molding processes to be decoupled, but introduces extensive complexity and costs associated with properly transporting and handling of the raw material. The system of FIG. 1, and the associated methods described supra, eliminates the complexity, cost, material waste and energy usage that is associated with storing and transporting of refrigerated raw material. Since the prepreg is produced directly in-line with the molding process, part shortages do not occur as a result of having an insufficient supply of prepreg on hand in cold storage, or as a result of degradation of the prepreg that is on hand. Consequently, production delays do not occur on the lines that require the supply of the composite article.

Figure 2:
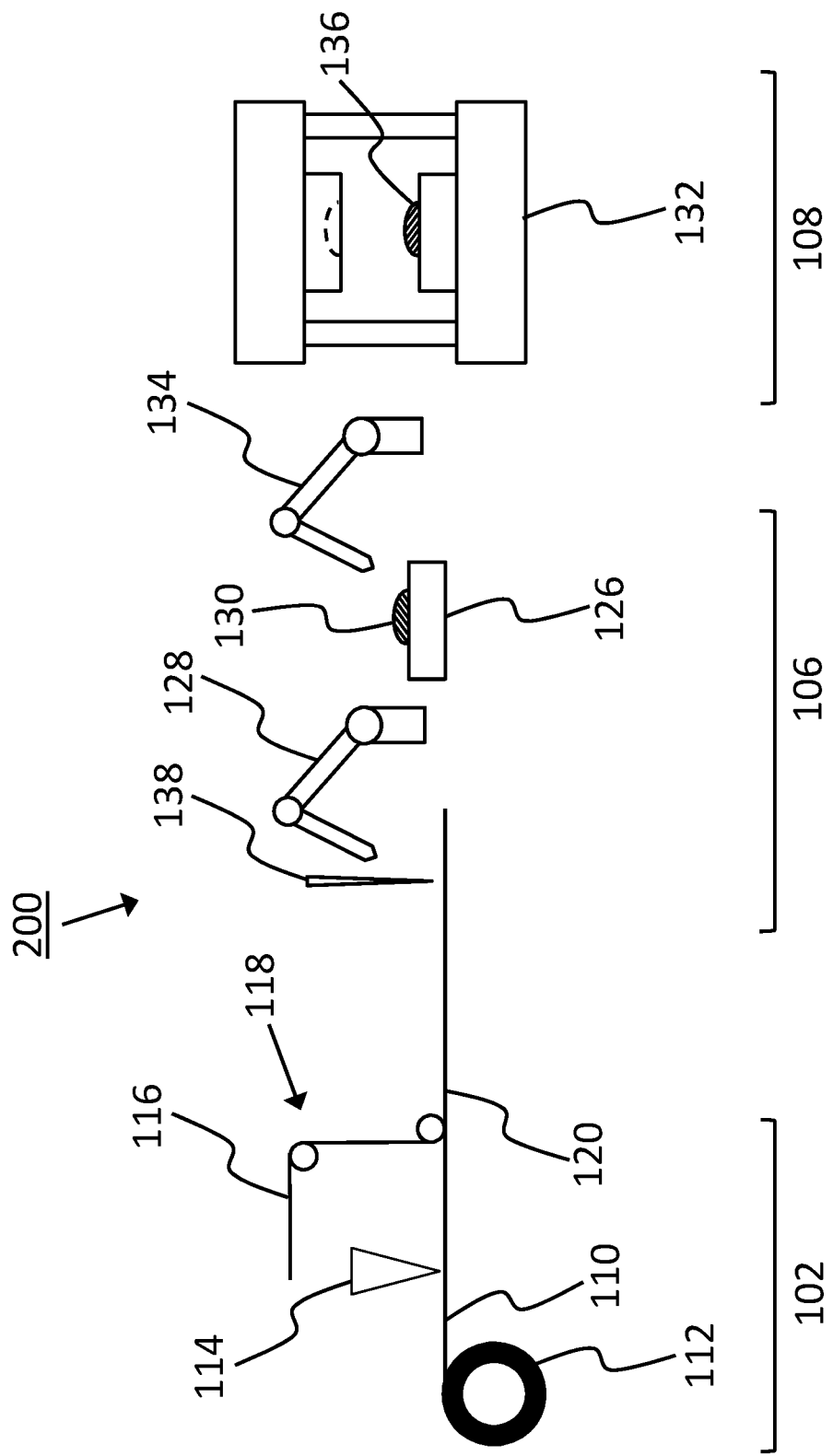
FIG. 2 is a simplified diagram illustrating a system 200 for the direct inline molding of composite articles, according to another embodiment of the instant invention.

In an alternative embodiment, the system 100 of FIG. 1 is modified such that the pre-impregnation station 102 is configured to produce a thermoplastic prepreg or a thermosetting prepreg without partial curing. In this alternative embodiment the curing station 104 is omitted, resulting in the system 200 as shown in FIG. 2. Thus, the thermoplastic or thermosetting prepreg that is produced in the pre-impregnation station 102 is fed to the blanking station 106 where a blank is cut from the prepreg using an automated cutter 138. The blank is then transferred to the preforming mold 126 where it is arranged such that a shape of the blank corresponds approximately to a final shape of the composite article. The arranged blank may include multiple plies and/or inserts/reinforcement/attachment features, etc. The blank is subsequently transferred from the preforming mold 126 to the compression mold 132 of the forming station 108. For instance, the blank is transferred from the preforming mold 126 to the compression mold 132 under the control of a robot 134.

According to this alternative embodiment, while a first blank is being formed into the composite article in the compression mold a second blank is being produced more or less concurrently. That is to say, a rate of producing the thermoplastic prepreg is selected to approximately match a rate of forming the composite article in the compression mold. In this way, the thermoplastic prepreg is produced and formed into the composite article on a sufficiently short time scale such that the temperature of the prepreg does not decrease to substantially room temperature. The heat history of the prepreg according to this embodiment of the invention therefore has one less cooling and heating cycle compared to prior art solutions. Further advantageously, the heat that is added during the formation of the prepreg is "reused," since the prepreg is transferred into the compression mold sufficiently quickly that it does not cool to room temperature between the impregnation step and the forming step. The energy savings that are realized by avoiding the cooling and reheating of the prepreg are a consequence of the coupling together of the impregnation and forming steps.

Figure 3:
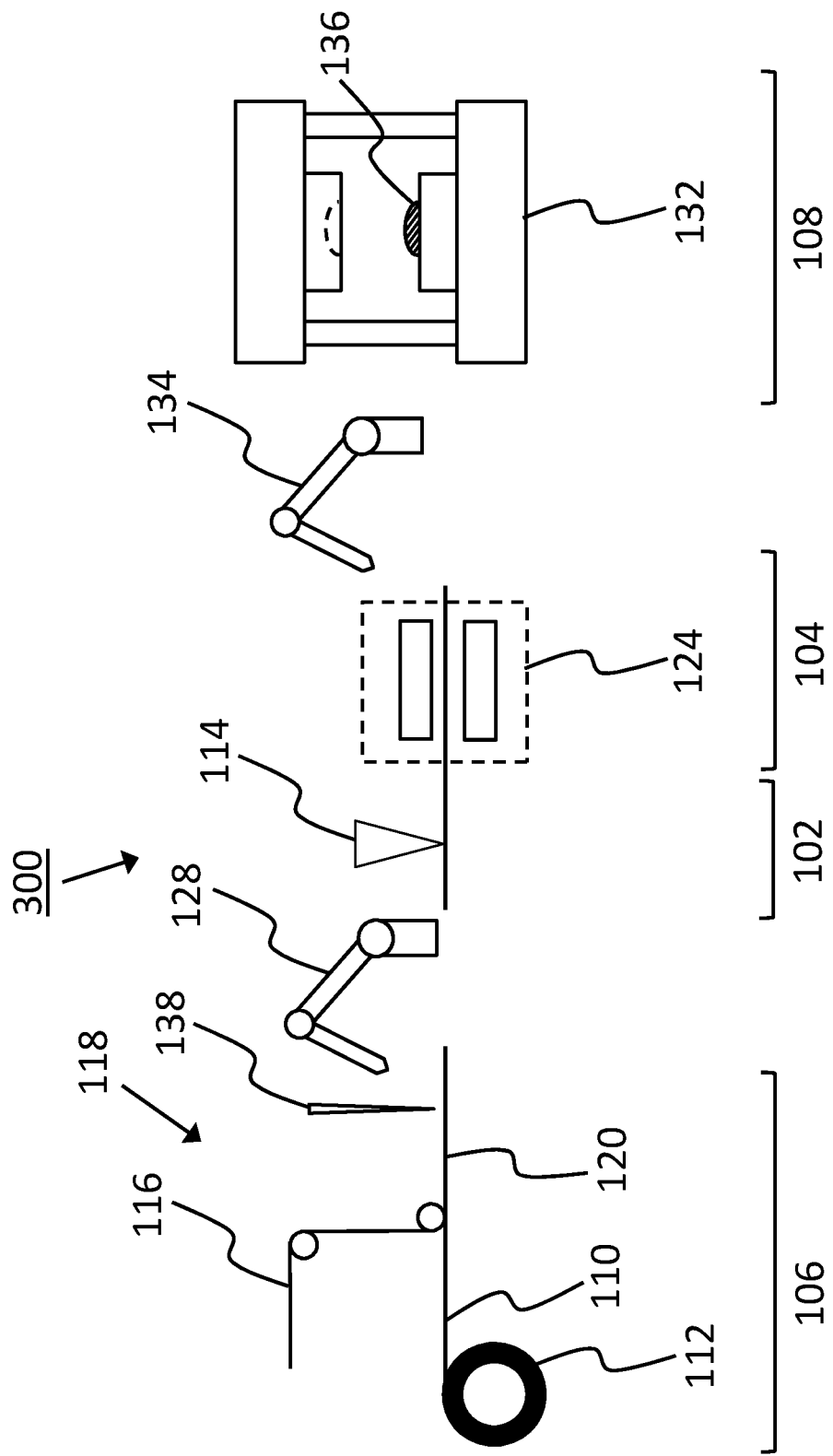
FIG. 3 is a simplified diagram illustrating a system 300 for the direct inline molding of composite articles, according to another embodiment of the instant invention.

In another alternative embodiment shown in FIG. 3, the order of the various stations 102, 104 (when present), 106 and 108 is modified. For instance, by way of a specific and non-limiting example, in the system 300 the stations are provided in the following order: blanking station 106; pre-impregnation station 102; curing station 104; and forming station 108. In this embodiment, the fiber reinforcement 116 is unwound onto carrier film 120, and a blank is cut from the fiber reinforcement 116 in the blanking station 106. The blank is transferred to pre-impregnation station 102 and is wetted with resin that is dispensed from resin applicator 114. Optionally the resin is thermosetting resin or thermoplatic resin. The pre-impregnated blank is passed through curing station 104, and then is arranged on a preforming mold (not shown) and finally transferred into compression mold 132 of forming station 108. Advantageously, cutting the fiber reinforcement prior to pre-impregnating reduces the wastage of the resin, which normally is trimmed away during blank formation in the blanking station 106.

Accordingly, yet another method of fabricating a composite article includes at least the following steps:
a) cutting a blank from a sheet of a fiber reinforcement, the cut blank having a shape for forming the composite article;
b) impregnating the cut blank with a resin to form a prepreg blank;
c) arranging the prepreg blank on a preforming mold such that a shape of the blank, when so arranged, corresponds approximately to a final shape of the composite article;
d) transferring the arranged blank from the preforming mold to a compression mold;
e) using the compression mold, applying heat and pressure to the blank so as to form the composite article; and
f) during forming of the composite article using the compression mold, repeating steps a) to c).

According to this method, when one blank is being formed in the compression mold another blank is being produced more or less concurrently. That is to say, a rate of producing the prepreg blank is selected to approximately match a rate of forming the composite article using the compression mold. In the case of a thermosetting prepreg, the sheet of fiber reinforcement is cut to form a blank, the blank is impregnated with resin to form a prepreg blank, the prepreg blank is optionally partially cured, the partially cured blank is arranged on a performing mold, and the arranged blank is formed into the composite article in the compression mold, all on a time scale that is faster than the degradation of the partially cured prepreg outside of cold storage. As such, subsequent to partially curing the prepreg it is other than necessary to either store or transport the partially cured prepreg using a refrigerated unit, such as for instance one or more of a cold room, a refrigerated truck and dry ice shipping materials.

Optionally, the step of partially curing the prepreg blank is omitted from the method as outlined above. In this case, the curing occurs entirely within the compression mold after the prepreg blank is transferred thereto and heat and pressure is applied.

Further optionally, the cut blank is impregnated with a thermoplastic resin and the method proceeds as outlined above.

While the above description constitutes a plurality of embodiments of the present invention, it will be appreciated that the present invention is susceptible to further modification and change without departing from the fair meaning of the accompanying claims.

What is claimed is:

1. A system for fabricating a composite article, comprising:
   a pre-impregnation station for forming a prepreg comprising a reinforcement impregnated with a resin, the pre-impregnation station comprising a carrier film unwind and a reinforcement unwind;
   a blanking station comprising a cutter for cutting a blank from the prepreg and for arranging the blank on a preforming mold, such that a shape of the blank, when so arranged, corresponds approximately to a final shape of the composite article; and
   a forming station comprising a compression mold for forming the composite article from the blank by the application of heat and pressure to said blank,
   wherein the pre-impregnation station, the blanking station and the forming station are co-located, such that while the blank is being formed into the composite article in the compression mold, additional prepreg is formed in the pre-impregnation station and passes to the blanking station to form a next blank for being formed into a next composite article in the compression mold during a subsequent molding cycle, and
   wherein the reinforcement unwind is disposed for unwinding the reinforcement onto one side of the carrier film, and wherein the prepreg carried by the carrier film extends continuously between the pre-impregnation station to the blanking station.

2. The system of claim 1 wherein the pre-impregnation station and the blanking station cooperate to produce a blank arranged on the preforming mold within a period of time that corresponds approximately to a cycle time of the compression mold, such that a next blank is being produced while the composite article is being formed in the compression mold.

3. The system of claim 1 comprising a curing station disposed between the pre-impregnation station and the blanking station, the curing station comprising one of a heat source and a source of ultraviolet radiation and the curing station for partially curing the prepreg that is formed in the pre-impregnation station.

4. The system of claim 3 comprising a robot disposed between the curing station and the blanking station, the robot for transferring the partially cured prepreg from the curing station to the blanking station.

5. The system of claim 1 comprising a robot disposed between the blanking station and the forming station, the robot for transferring the arranged blank from the blanking station to the forming station.

6. The system of claim 1 wherein the system does not comprise a refrigerated storage unit.

7. The system of claim 1 wherein the system does not comprise a refrigerated transport unit.

8. A method of fabricating a composite article, comprising:
performing a pre-impregnation process at a pre-impregnation station to form a prepreg having a reinforcement impregnated with a resin, the pre-impregnation process performed at a predetermined rate;
molding the prepreg to form the composite article, each cycle of the molding having a known cycle time and comprising:
cutting a blank from the prepreg at a blanking station;
arranging the blank on a preforming mold to form a preformed blank, such that a shape of the blank, when so arranged, corresponds approximately to a final shape of the composite article;
transferring the preformed blank from the preforming mold to a compression mold; and
applying heat and pressure to the preformed blank inside the compression mold so as to form the composite article,
wherein the rate of the pre-impregnation process is predetermined based on the known cycle time of the molding process, such that during each current molding cycle the pre-impregnation process yields a quantity of prepreg to form the blank for use in a corresponding next molding cycle, and
wherein the pre-impregnation station comprises a carrier film unwind and a reinforcement unwind, the reinforcement unwind being disposed for unwinding the reinforcement onto one side of a carrier film, and wherein the prepreg carried by the carrier film extends continuously between the pre-impregnation station to the blanking station.

9. The method of claim 8 wherein the resin is one of a thermosetting resin and a thermoplastic resin.

10. The method of claim 9 further comprising, prior to molding, a step of partially curing the prepreg.

11. The method of claim 10 wherein partially curing the prepreg comprises one of heating the prepreg and irradiating the prepreg with ultraviolet radiation.

12. The method of claim 10 wherein, prior to molding, the partially cured prepreg is not stored for a period of time that exceeds approximately one cycle time of the molding process.

13. The method of claim 10 wherein, prior to molding, the partially cured prepreg is not stored or transported using a refrigerated unit.

14. The method of claim 9 wherein the thermosetting resin is selected from the group consisting of an epoxy resin, vinyl ester, polyester and polyurethane.

15. The method of claim 8 wherein performing a pre-impregnation process comprises:
unwinding the carrier film from the carrier film unwind;
unwinding the reinforcement from the reinforcement unwind onto the one side of the carrier film; and
impregnating the reinforcement with the resin during unwinding of the carrier film and of the reinforcement, such that the prepreg is formed continuously during the pre-impregnation process and at the predetermined rate.

16. The method of claim 8 wherein the reinforcement comprises fibers selected from the group consisting of glass fibers, carbon fibers, aramid fibers and basalt fibers.

* * * * *